(12) United States Patent
Amagai et al.

(10) Patent No.: US 9,153,807 B2
(45) Date of Patent: Oct. 6, 2015

(54) LAMINATED BATTERY AND MANUFACTURING METHOD THEREOF

(75) Inventors: Ryuichi Amagai, Isehara (JP); Masayuki Nakamura, Kuki (JP)

(73) Assignees: NISSAN MOTOR CO., LTD., Yokohama-shi (JP); CALSONIC KANSEI CORPORATION, Saitama-shi (JP)

( * ) Notice: Subject to any disclaimer, the term of this patent is extended or adjusted under 35 U.S.C. 154(b) by 550 days.

(21) Appl. No.: 13/266,226

(22) PCT Filed: May 14, 2010

(86) PCT No.: PCT/JP2010/058575
§ 371 (c)(1),
(2), (4) Date: Oct. 25, 2011

(87) PCT Pub. No.: WO2010/131780
PCT Pub. Date: Nov. 18, 2010

(65) Prior Publication Data
US 2012/0040234 A1    Feb. 16, 2012

(30) Foreign Application Priority Data

May 15, 2009  (JP) ................................. 2009-118228
May 13, 2010  (JP) ................................. 2010-111330

(51) Int. Cl.
H01M 2/10       (2006.01)
H01M 2/20       (2006.01)
H01M 2/30       (2006.01)
H01M 2/34       (2006.01)
H01M 10/052     (2010.01)

(52) U.S. Cl.
CPC ............ *H01M 2/1077* (2013.01); *H01M 2/206* (2013.01); *H01M 2/305* (2013.01); *H01M 2/34* (2013.01); *H01M 10/052* (2013.01); *Y10T 29/49108* (2015.01)

(58) Field of Classification Search
CPC ..... H01M 2/1077; H01M 2/206; H01M 2/34; H01M 2/305; H01M 10/052; Y10T 29/49108
USPC ....................................................... 429/153
See application file for complete search history.

(56) References Cited

U.S. PATENT DOCUMENTS 5,384,685 A    1/1995   Tong et al.
5,424,149 A    6/1995   Imhof et al.
(Continued)

FOREIGN PATENT DOCUMENTS

CN    1379496 A    11/2002
CN    1839496 A    9/2006
(Continued)

OTHER PUBLICATIONS

Chinese Office Action, Jul. 31, 2013, 5 pages.
(Continued)

*Primary Examiner* — Sean P Cullen
(74) *Attorney, Agent, or Firm* — Foley & Lardner LLP

(57) ABSTRACT

A laminated battery formed by laminating a plurality of flat cells each having an electrode tab includes: an insulating member disposed to prevent a short-circuit in the electrode tab; and a terminal connected to the electrode tab, wherein a tip end side of the terminal is supported by a support member provided on the insulating member.

18 Claims, 12 Drawing Sheets

(56) References Cited

U.S. PATENT DOCUMENTS

| | | | |
|---|---|---|---|
| 5,464,453 | A | 11/1995 | Tong et al. |
| 5,711,988 | A | 1/1998 | Tsai et al. |
| 5,800,857 | A | 9/1998 | Ahmad et al. |
| 5,821,033 | A | 10/1998 | Cromack et al. |
| 5,867,363 | A | 2/1999 | Tsai et al. |
| 6,005,764 | A | 12/1999 | Anderson et al. |
| 6,120,935 | A | 9/2000 | Van Lerberghe |
| 6,428,363 | B2 * | 8/2002 | Tamai et al. ............ 439/677 |
| 6,514,296 | B1 | 2/2003 | Tsai et al. |
| 6,808,844 | B2 | 10/2004 | Ehara |
| 7,105,248 | B2 | 9/2006 | Yageta et al. |
| 7,410,724 | B2 | 8/2008 | Yageta et al. |
| 7,615,309 | B2 | 11/2009 | Kim et al. |
| 7,629,073 | B2 | 12/2009 | Cho et al. |
| 7,807,288 | B2 | 10/2010 | Yoon et al. |
| 7,892,666 | B2 | 2/2011 | Nakano et al. |
| 2002/0142195 | A1 | 10/2002 | Ehara |
| 2005/0140338 | A1 | 6/2005 | Kim et al. |
| 2005/0260486 | A1 | 11/2005 | Cho et al. |
| 2006/0170394 | A1 | 8/2006 | Ha et al. |
| 2006/0214631 | A1 | 9/2006 | Yoon et al. |
| 2007/0141457 | A1 | 6/2007 | Amagai |

FOREIGN PATENT DOCUMENTS

| | | |
|---|---|---|
| CN | 1988215 A | 6/2007 |
| EP | 0 863 564 A1 | 9/1998 |
| JP | 2003-288883 A | 10/2003 |
| JP | 2005-222703 A | 8/2005 |
| JP | 2006-210312 A | 8/2006 |
| JP | 2007-503690 A | 2/2007 |
| JP | 2009-37785 A | 2/2009 |
| RU | 2193927 C2 | 12/2002 |
| RU | 2323507 C1 | 4/2008 |
| RU | 2336600 C1 | 10/2008 |
| WO | WO 2005/060025 A1 | 6/2005 |
| WO | WO 2006/073071 A1 | 7/2006 |

OTHER PUBLICATIONS

Chinese Office Action, Apr. 1, 2014, 9 pages.
European Extended Search Report, Jan. 3, 2014, 5 pages.

* cited by examiner

LAMINATED BATTERY AND
MANUFACTURING METHOD THEREOF

TECHNICAL FIELD

This invention relates to a laminated battery and a manufacturing method thereof.

BACKGROUND ART

JP2006-210312A, published by the Japan Patent Office in 2006, discloses a battery pack formed by laminating a plurality of flat cells, each formed by sealing a power generating element with a covering material and a leading plate-shaped electrode tab to the outside from the covering material, and electrically connecting the electrode tabs of the respective flat cells to each other.

SUMMARY OF THE INVENTION

In this conventional battery pack, the electrode tab and an output terminal of the plate-shaped battery pack are overlapped and sandwiched by a pair of insulating plates. When power is input and output to and from the battery pack, a connecting member is connected to the output terminal by screwing or the like. As a result, external forces such as rotary torque generating during the screwing and vehicle vibration may be exerted on the output terminal such that stress concentrates in a joint portion between the electrode tab and the output terminal.

It is therefore an object of this invention to suppress stress concentration in a joint portion between an electrode tab and an output terminal.

To achieve this object, this invention is a laminated battery formed by laminating a plurality of flat cells each having an electrode tab, including: an insulating member disposed to prevent a short-circuit in the electrode tab; and a terminal connected to the electrode tab, wherein a tip end side of the terminal is supported by a support member provided on the insulating member.

Details of this invention as well as other features and advantages are set forth in the following description of the specification and illustrated in the attached drawings.

BEST MODES FOR CARRYING OUT THE INVENTION

Figure 1:
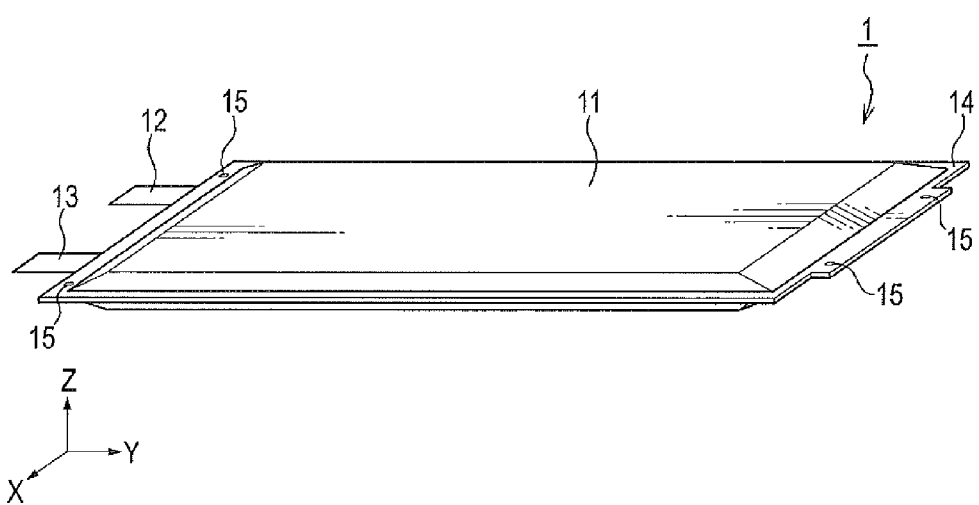
FIG. 1 is a perspective view of a unit cell according to a first embodiment of this invention.

FIG. 1 is a perspective view of a unit cell 1 according to a first embodiment of this invention.

The unit cell 1 is a thin, flat lithium ion secondary battery including a power generating element that can be charged and discharged, an outer covering member 11 housing the power generating element in its interior, and a plate-shaped positive electrode tab 12 and a plate-shaped negative electrode tab 13 for drawing power generated by the power generating element to the outside.

The power generating element is constituted by an electrode laminated body, in which a positive electrode plate and a negative electrode plate are laminated alternately via a separator, and an electrolyte. The structure and principles of the power generating element are well known, and therefore detailed description thereof has been omitted.

The outer covering member 11 is constituted by a laminate film having a rectangular shape when seen from above and formed by laminating a synthetic resin film onto either surface of metal foil. The power generating element is housed in the interior of the outer covering member 11 by thermally welding outer peripheral portions of two laminate films while the power generating element is housed therein to form flanges 14. Two fixing holes 15 for inserting fixing pins 212 (see FIG. 3) of a spacer to be described below are formed in the flanges 14 on each short side of the outer covering member 11.

The positive electrode tab 12 and the negative electrode tab 13 are both provided on one short side of the outer covering member 11. One end of the positive electrode tab 12 is positioned on the exterior of the outer covering member 11, and the other end of the positive electrode tab 12 is connected to the positive electrode plate forming the power generating element in the interior of the outer covering member 11. One end of the negative electrode tab 13 is positioned on the exterior of the outer covering member 11, and the other end of the negative electrode tab 13 is connected to the negative electrode plate forming the power generating element in the interior of the outer covering member 11.

Figure 2:
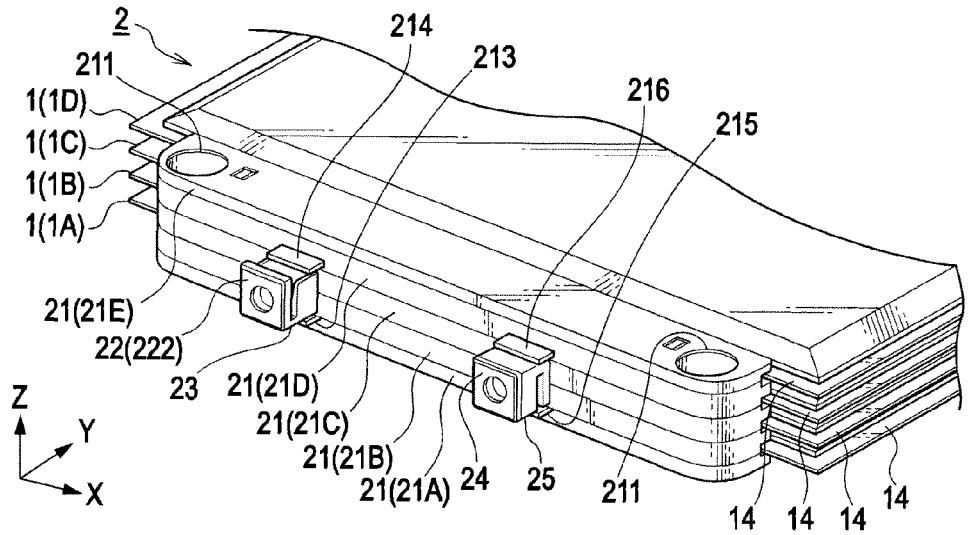
FIG. 2 is a perspective view of a laminated battery according to the first embodiment of this invention, in which four unit cells are laminated.
Figure 3:
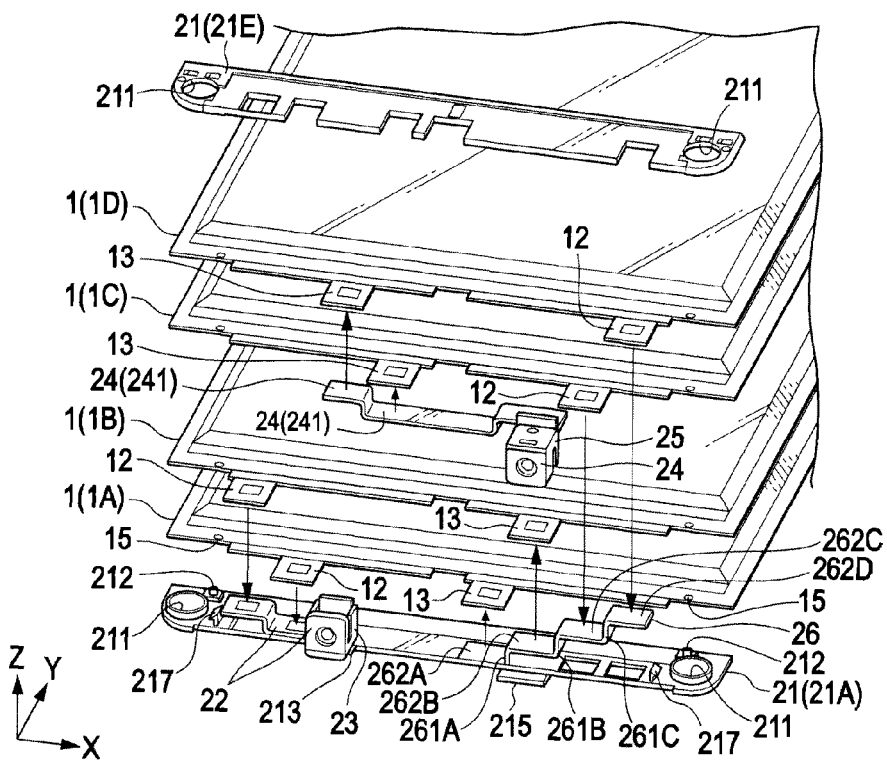
FIG. 3 is an exploded perspective view of the laminated battery.

FIG. 2 is a perspective view of a laminated battery 2 according to the first embodiment of this invention, in which four of the unit cells 1 are laminated, and a perspective view showing the short side on which the positive electrode tab 12 and the negative electrode tab 13 are provided. FIG. 3 is an exploded perspective view of the laminated battery 2.

Referring to FIGS. 2 and 3, the laminated battery 2 will be described below.

As shown in FIG. 2, the laminated battery 2 includes the four unit cells 1, five spacers 21, a positive electrode terminal (bus bar) 22, a positive electrode terminal support member 23, a negative electrode terminal (bus bar) 24, and a negative electrode terminal support member 25. The positive electrode terminal 22 and the negative electrode terminal 24 respective serve as power input/output terminals.

When there is a particular need in the following description to differentiate between the four unit cells 1, the four unit cells 1 will be referred to as a unit cell 1A, a unit cell 1B, a unit cell 1C, and a unit cell 1D in order from the unit cell 1 on a lower side of the figure. Similarly, when there is a particular need to differentiate between the five spacers 21, the five spacers 21 will be referred to as a spacer 21A, a spacer 21B, a spacer 21C, a spacer 21D, and a spacer 21E in order from the spacer 21 on the lower side of the figure. FIG. 3 shows only the lowermost spacer 21A and the uppermost spacer 21E of the five spacers 21.

As shown in FIG. 2, the four unit cells 1 are laminated so as to be in close contact with each other and so that the positive electrode tabs 12 and the negative electrode tabs 13 exist in an identical direction.

The five spacers 21 are plate-shaped members each constituted by a synthetic resin material or the like exhibiting a superior electrical insulating property. Bolt insertion holes 211 for inserting bolts to fix the laminated battery 2 to a battery case 31 (see FIG. 6) to be described below are formed in respective ends of the five spacers 21.

Further, the five spacers 21 are respectively laminated so as to sandwich the short side flanges 14 provided with the positive electrode tab 12 and the negative electrode tab 13. More specifically, the short side flange 14, positive electrode tab 12, and negative electrode tab 13 of the unit cell 1A are sandwiched by the spacer 21A and the spacer 21B. The short side flange 14, positive electrode tab 12, and negative electrode tab 13 of the unit cell 1B are sandwiched by the spacer 21B and the spacer 21C. The short side flange 14, positive electrode tab 12, and negative electrode tab 13 of the unit cell 1C are sandwiched by the spacer 21C and the spacer 21D. The short side flange 14, positive electrode tab 12, and negative electrode tab 13 of the unit cell 1D are sandwiched by the spacer 21D and the spacer 21E. It should be noted that the short side flanges 14 not provided with the positive electrode tab 12 and the negative electrode tab 13 are sandwiched similarly between five separate spacers 21.

As shown in FIG. 3, fixing pins 212 are formed on either end of a laminating surface of the spacer 21A so as to project from an upper surface thereof, and inserted into the fixing holes 15 formed in the flange 14 of the unit cell 1A. Fixing pins having a similar function are also formed on the spacer 21B, the spacer 21C, and the spacer 21D.

Further, L-shaped engaging pawls 217 are formed on either end of the laminating surface of the spacer 21A so as to project from the upper surface thereof. The engaging pawls 217 are engaged with L-shaped engaging holes (not shown) formed in a lower surface of the spacer 21B. By engaging the engaging pawls 217 of the spacer 21A with the engaging holes in the spacer 21B, the spacer 21A and the spacer 21B are coupled. Similar engaging pawls are formed on the spacer 21B, the spacer 21C, and the spacer 21D, and similar engaging holes are formed on the spacer 21C, the spacer 21D, and the spacer 21E. By engaging the respective engaging pawls with the respective engaging holes, adjacent spacers 21 are coupled.

An intermediate terminal (bus bar) 26 is disposed on the laminating surface of the spacer 21A on a right side of the figure, and a part of the positive electrode terminal 22 is disposed on a left side.

The intermediate terminal 26 is formed by bending a strip-form conductor not provided with an insulating film, and takes a staircase shape including three bend portions 261A to 261C and four flat surfaces 262A to 262D. The negative electrode tab 13 of the unit cell 1A is overlapped with the flat surface 262A of a first step and joined thereto by ultrasonic welding or the like, and in this condition, the flat surface 262A is sandwiched between the spacer 21A and the spacer 21B. The negative electrode tab 13 of the unit cell 1B is overlapped with the flat surface 262B of a second step and joined thereto by ultrasonic welding or the like, and in this condition, the flat surface 262B is sandwiched between the spacer 21B and the spacer 21C. The positive electrode tab 12 of the unit cell 1C is overlapped with the flat surface 262C of a third step and joined thereto by ultrasonic welding or the like, and in this condition, the flat surface 262C is sandwiched between the spacer 21C and the spacer 21D. The positive electrode tab 12 of the unit cell 1D is overlapped with the flat surface 262D of a fourth step and joined thereto by ultrasonic welding or the like, and in this condition, the flat surface 262D is sandwiched between the spacer 21D and the spacer 21E.

Figure 4:
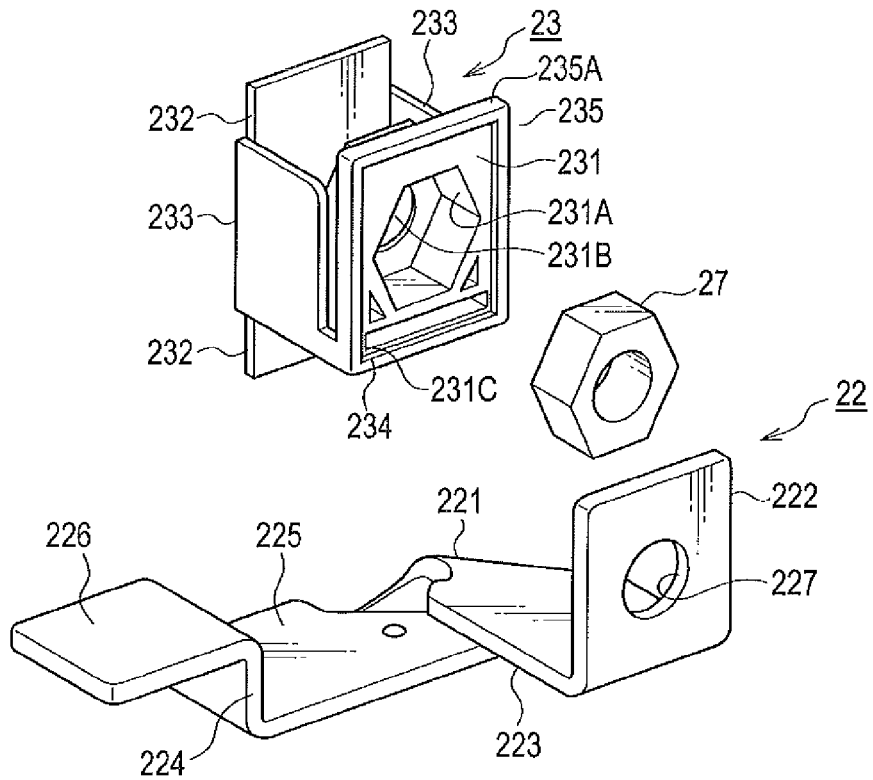
FIG. 4 is an exploded perspective view of a positive electrode terminal and a positive electrode terminal support member.
Figure 5:
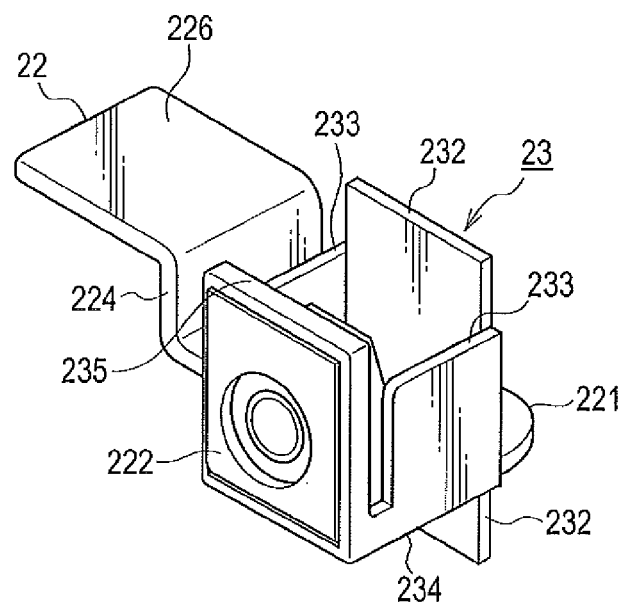
FIG. 5 is a perspective view of the positive electrode terminal to which the positive electrode terminal support member is attached.

The positive electrode terminal 22 is formed by bending a strip-form conductor not provided with an insulating film. The positive electrode terminal support member 23 is formed from a synthetic resin box having an insulating property, and attached to the positive electrode terminal 22. Referring to FIGS. 4 and 5, the positive electrode terminal 22 and the positive electrode terminal support member 23 will now be described further.

FIG. 4 is an exploded perspective view of the positive electrode terminal 22 and the positive electrode terminal support member 23. FIG. 5 is a perspective view showing a condition in which the positive electrode terminal support member 23 is attached to the positive electrode terminal 22. In this embodiment, the positive electrode terminal 22 and the positive electrode terminal support member 23 are formed integrally by insert molding, for example.

The positive electrode terminal 22 includes a twisted portion 221, a terminal portion 222, a support member attachment portion 223, a bent portion 224, a first joint portion 225, and a second joint portion 226.

The twisted portion 221 is formed near a center of the conductor by pulling up one end side of the conductor while twisting the one end side, and then pressing down the one end side of the conductor in a right angle direction.

The terminal portion 222 is formed by further pulling up an end portion of the one end side of the conductor pressed down in the right angle direction to substantially form a right angle. The terminal portion 222 takes a substantially square flat plate shape, and a bolt through hole 227 is formed in a center thereof. The bolt through hole 227 is provided so that an appropriate connecting member for electrically connecting the positive electrode terminal 22 to an input/output terminal of another laminated battery 2 or a terminal of an external device such as a motor, for example, can be fastened using a bolt.

The support member attachment portion 223 is a flat region formed between the twisted portion 221 and the terminal portion 222. The positive electrode terminal support member 23 is attached to the support member attachment portion 223.

The bent portion 224 is formed by bending the conductor in the vicinity of a central location between the twisted portion 221 and the other end of the conductor.

The first joint portion 225 is a flat region extending from the twisted portion 221 to the bent portion 224. The positive electrode tab 12 of the unit cell 1A is overlapped with the first joint portion 225 and joined thereto by ultrasonic welding or the like, and in this condition, the first joint portion 225 is sandwiched between the spacer 21A and the spacer 21B.

The second joint portion 226 is a flat region extending from the bent portion 224 to the other end of the conductor. The positive electrode tab 12 of the unit cell 1B is overlapped with the second joint portion 226 and joined thereto by ultrasonic welding or the like, and in this condition, the second joint portion 226 is sandwiched between the spacer 21B and the spacer 21C.

The positive electrode terminal support member 23 includes a front surface wall 231, a back surface wall 232, side surface walls 233, and a bottom surface wall 234.

A recessed portion 231A having a hexagonal shape that corresponds to an outer shape of a nut 27 incorporated into the positive electrode terminal support member 23 is formed in a center of the front surface wall 231. The nut 27 is a member for screwing a bolt used when the connecting member is fastened to the terminal portion 222 of the positive electrode terminal 22, and is press-fitted into the recessed portion 231A fixedly and held by the front surface wall 231.

A bolt through hole 231B is formed in the front surface wall 231 further toward the back surface wall 232 side than the recessed portion 231A, and a tip end portion of the bolt screwed to the nut 27 penetrates the bolt through hole 227 in the positive electrode terminal 22.

A rectangular through hole 231C penetrated by the support member attachment portion 223 of the positive electrode terminal 22 is formed below the recessed portion 231A. A rectangular through hole 232A (see FIG. 8) penetrated by the support member attachment portion 223 is formed similarly in the back surface wall 232, and by inserting the support member attachment portion 223 through the respective through holes 231C, 232A, the positive electrode terminal support member 23 is attached to the positive electrode terminal 22.

An outer edge wall 235 extending toward the terminal portion 222 side of the positive electrode terminal 22 is formed on an outer edge of the front surface wall 231. The outer edge wall 235 is formed to cover an outer edge of the terminal portion 222 when the positive electrode terminal support member 23 is attached to the positive electrode terminal. The terminal portion 222 is held by the outer edge wall 235.

The back surface wall 232 (i.e., a wall portion) takes a rectangular shape extending upward in the figure from an upper end surface 235A of the outer edge wall 235 and downward in the figure from the bottom surface wall 234 (i.e., a wall surface). Here, as shown in FIG. 2, a lower end portion of the back surface wall 232 is fitted to a site 213 (i.e., a first holding portion) that partially projects to the terminal portion 222 side of the positive electrode terminal 22 from a side surface of the spacer 21A, and an upper end portion of the back surface wall 232 is fitted to a site 214 (i.e., a second holding portion) that partially projects to the terminal portion 222 side of the positive electrode terminal 22 from the side surface of the spacer 21D. Thus, the positive electrode terminal support member 23 is held by the spacer 21A and the spacer 21D such that the positive electrode terminal 22 is supported fixedly by the positive electrode terminal support member 23. It should be noted that a specific manner in which the positive electrode terminal support member 23 is held by the spacer 21A and the spacer 21D will be described below with reference to FIGS. 7 and 8.

The bottom surface wall 234 is positioned below the support member attachment portion 223 of the positive electrode terminal 22, which penetrates the through holes 231C, 232A formed respectively in the front surface wall 231 and the back surface wall 232, in order to support the support member attachment portion 223.

Referring back to FIGS. 2 and 3, the negative electrode terminal 24 and the negative electrode terminal support member 25 will be described.

The negative electrode terminal 24 is formed by bending a strip-form conductor not provided with an insulating film. The negative electrode terminal 24 differs from the positive electrode terminal 22 in shape, but exhibits similar functions to the positive electrode terminal 22.

The negative electrode tab 13 of the unit cell 1C is overlapped with a first joint portion 241 of the negative electrode terminal 24 and joined thereto by ultrasonic welding or the like, and in this condition, the first joint portion 241 is sandwiched between the spacer 21C and the spacer 21D. The negative electrode tab 13 of the unit cell 1D is overlapped with a second joint portion 242 of the negative electrode terminal 24 and joined thereto by ultrasonic welding or the like, and in this condition, the second joint portion 242 is sandwiched between the spacer 21D and the spacer 21E.

The negative electrode terminal support member 25 is formed from a synthetic resin box having an insulating property, and attached to the negative electrode terminal 24. The negative electrode terminal support member 25 differs from the positive electrode terminal support member 23 in that a rectangular through hole formed in a front surface wall thereof is positioned above a recessed portion, but is otherwise identical thereto in constitution and function. Similarly to the positive electrode terminal support member 23, the negative electrode terminal support member 25 is held by a site 215 (i.e., a first holding portion) that partially projects from the side surface of the spacer 21A and a site 216 (i.e., a second holding portion) that partially projects from the side surface of the spacer 21D.

Figure 6:
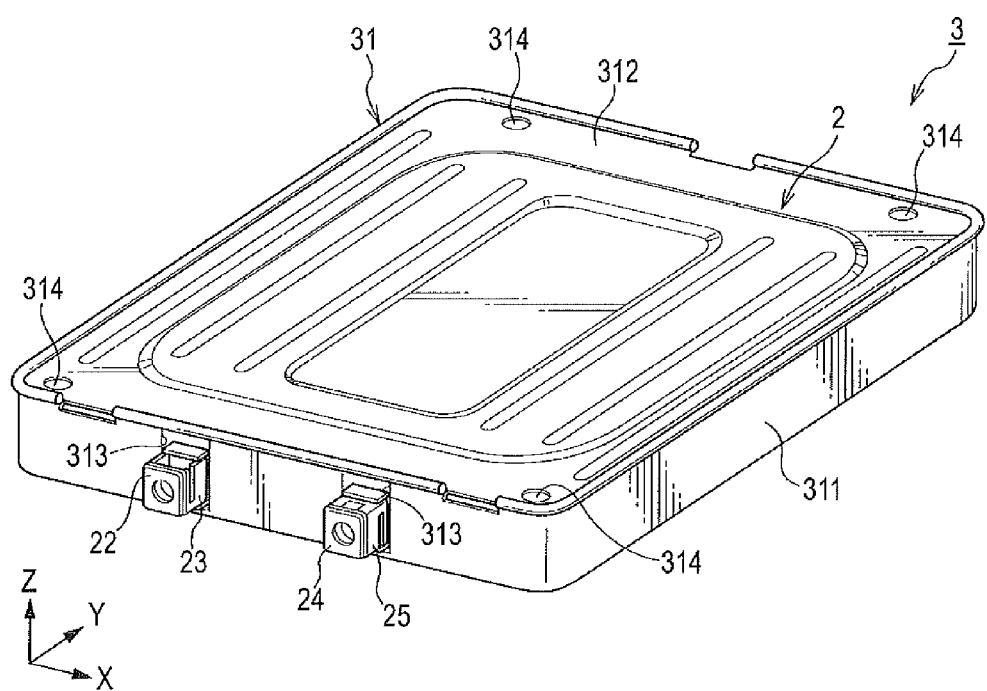
FIG. 6 is a perspective view of a battery module according to the first embodiment of this invention, which is formed by housing the laminated battery in the interior of a battery case.

FIG. 6 is a perspective view of a battery module 3 according to the first embodiment of this invention, which is formed by housing the laminated battery 2 in the interior of the battery case 31.

The battery case 31 includes a box-shaped lower case 311 having an open upper portion, and an upper case 312 for closing the opening in the lower case 311. The lower case 311 and the upper case 312 are fixed by rolling together respective outer edge portions thereof.

The lower case 311 includes cutouts 313 (i.e., hole portions) through which the positive electrode terminal 22 and negative electrode terminal 24 of the laminated battery 2 housed in the interior project from a side surface of the lower case 311.

Four insertion holes 314 are formed in the upper case 312 to correspond to the bolt insertion holes 211 formed in the spacers 21 of the laminated battery 2. Further, four insertion holes (not shown) are likewise formed in the lower case 311 to correspond to the bolt insertion holes 211 formed in the spacers 21 of the laminated battery 2. The laminated battery 2 is fixed to the battery case 31 by inserting bolts into the insertion holes 314 in the upper case 312, the bolt insertion holes 211 in the laminated battery 2, and the insertion holes in the lower case 311.

The battery module 3 formed in this manner is installed in an electric automobile as an energy supply source, for example, and by connecting an arbitrary number of the battery modules 3 in series or in parallel via the positive electrode terminal 22 and the negative electrode terminal 24, a vehicle-installed battery having a desired voltage and a desired energy capacity is formed.

When the battery modules 3 are electrically connected to each other to form a vehicle-installed battery, the respective terminals 22, 24 of one battery module 3 are connected to the respective terminals 22, 24 of another battery module 3 by an appropriate connecting member. At this time, the connecting member is fastened by being screwed to the respective terminals 22, 24 or the like. Accordingly, rotary torque generated during the screwing is exerted on the terminals 22, 24 as an external force. Moreover, external force is exerted on the terminals 22, 24 by vibration generated during vehicle travel.

Hence, when the positive electrode terminal 22 and the negative electrode terminal 24 are not supported fixedly by the positive electrode terminal support member 23 and the negative electrode terminal support member 25, in contrast to this embodiment, the following problems occur.

Figure 14:
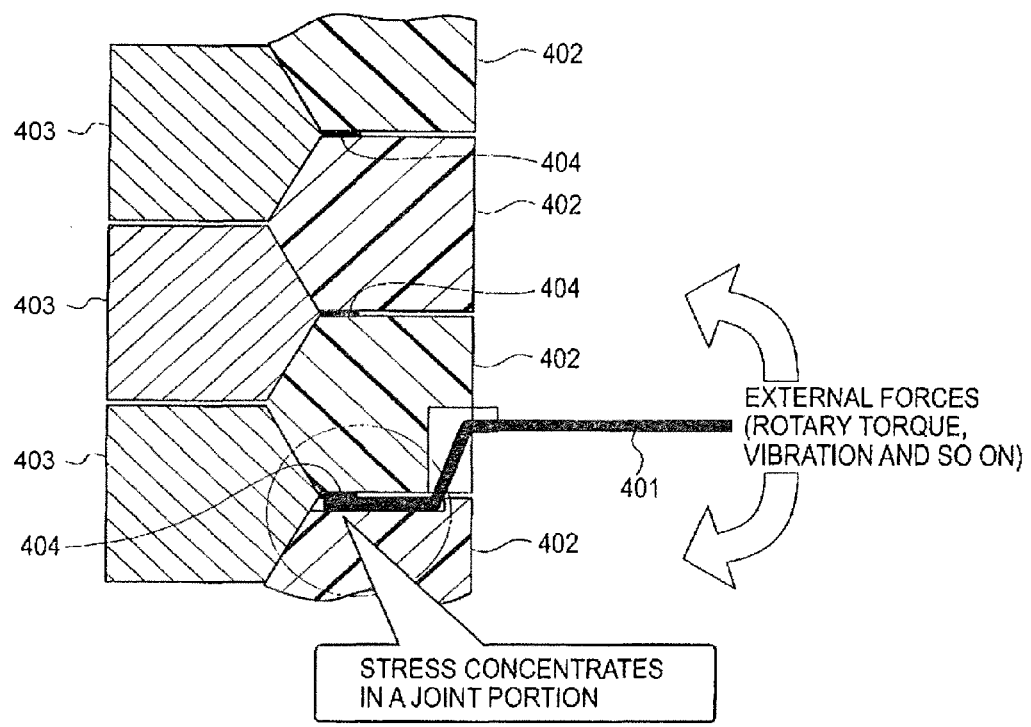
FIG. 14 is a latitudinal sectional view of the main parts of a laminated battery, illustrating stress concentration occurring when a terminal is not supported fixedly by a terminal support member.

FIG. 14 is a latitudinal sectional view of the main parts of a laminated battery, illustrating stress concentration occurring when a terminal is not supported fixedly by a terminal support member, and serves as a view of a comparative example to which this embodiment is not applied.

As shown in FIG. 14, when a terminal 401 is not supported fixedly by a terminal support member and external forces caused by vibration and rotary torque generated during screwing are exerted on one end side of the terminal 401 projecting from spacers 402, stress concentrates in a joint portion of the terminal 401 sandwiched between the spacers 402 so as to overlap an electrode tab 404 of a unit cell 403. As a result, physical contact between the electrode tab 404 and the terminal 401 is insufficient, leading to a reduction in an output of the battery module.

In this embodiment, on the other hand, the terminal is supported fixedly by the terminal support member, and therefore stress concentration in a connection portion between the electrode tab and the terminal is suppressed.

Figure 7:
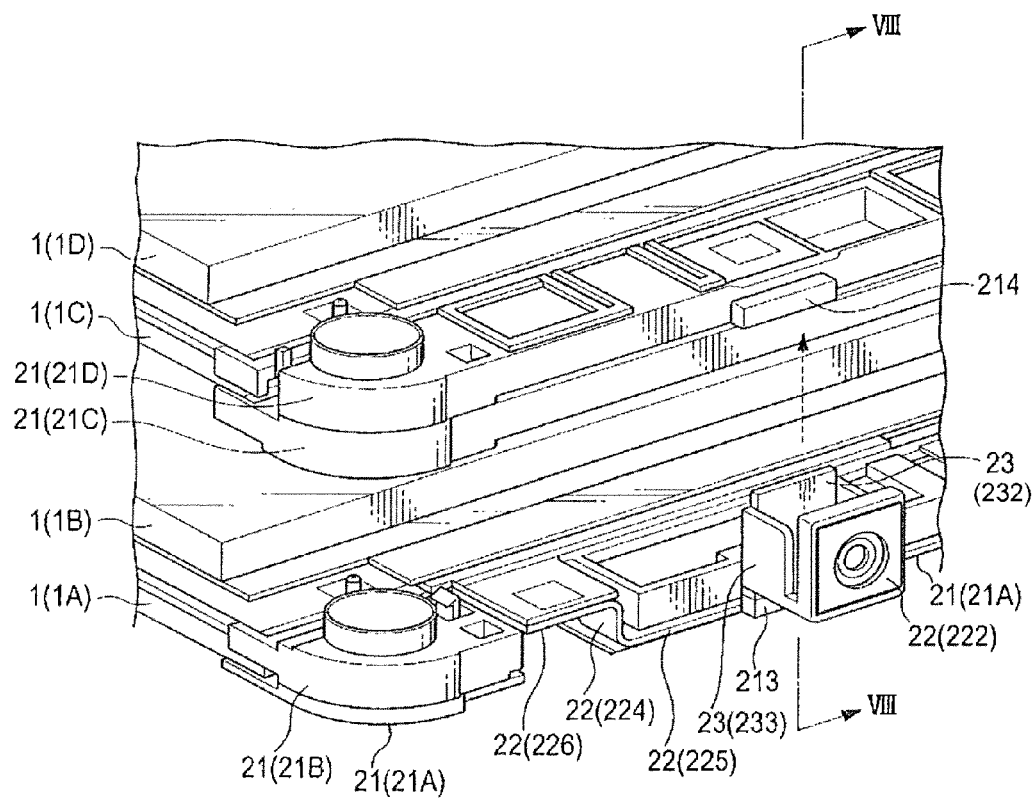
FIG. 7 is an exploded perspective view showing an enlargement of the positive electrode terminal part of the laminated battery.
Figure 8:
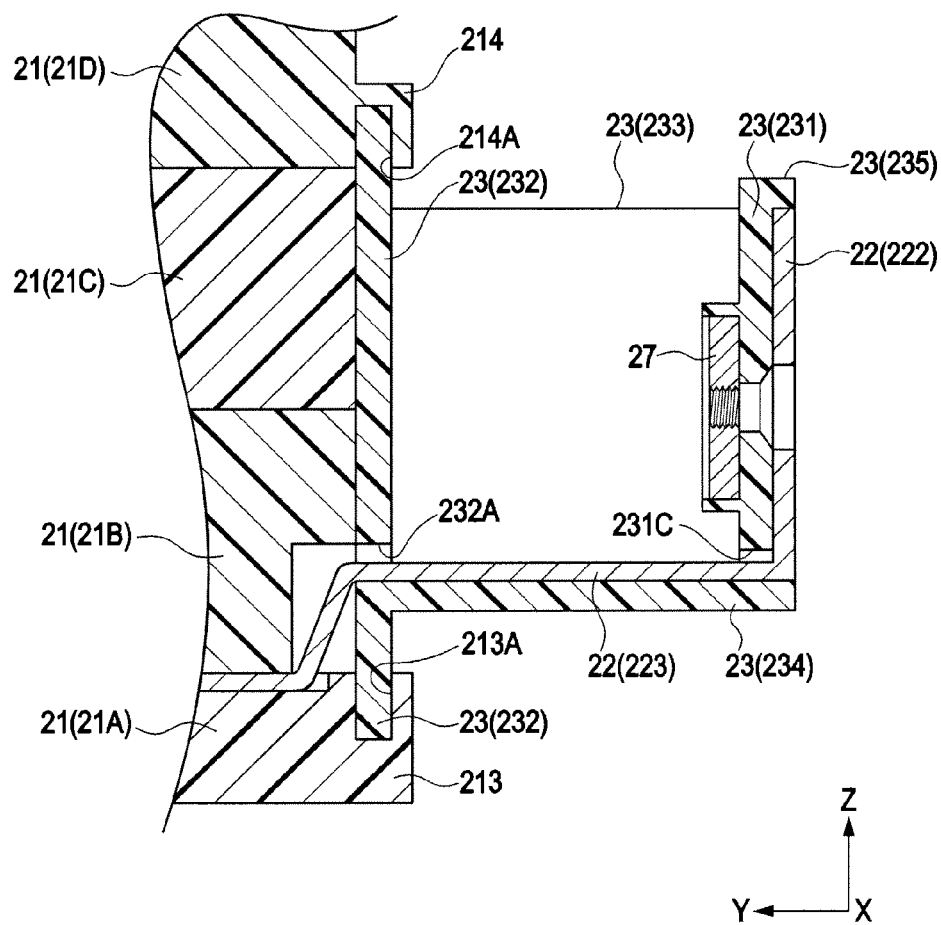
FIG. 8 is a VIII-VIII sectional view of FIG. 7.

Referring to FIGS. 7 and 8, the manner in which the positive electrode terminal support member 23 is held by the spacers 21 so as to support the positive electrode terminal 22 fixedly will be described below.

FIG. 7 is an exploded perspective view showing an enlargement of the vicinity of the positive electrode terminal support member 23 of the laminated battery 2. FIG. 8 is a VIII-VIII sectional view of FIG. 7.

As shown in FIG. 7, the site 213 (i.e., a first holding portion) projecting partially to the terminal portion 222 side of the positive electrode terminal 22 from the side surface of the spacer 21A is formed on the spacer 21A. As shown in FIG. 8, the projecting site 213 is formed with a fitting groove 213A into which the lower end portion of the back surface wall 232 of the positive electrode terminal support member 23 is fitted.

Further, as shown in FIG. 7, the site 214 (i.e., a second holding portion) projecting partially to the terminal portion 222 side of the positive electrode terminal 22 from the side surface of the spacer 21 D is formed on the spacer 21 D, and as shown in FIG. 8, the projecting site 214 is formed with a fitting groove 214A into which the upper end portion of the back surface wall 232 of the positive electrode terminal support member 23 is fitted.

By fitting the lower end portion of the back surface wall 232 of the positive electrode terminal support member 23 into the fitting groove 213A formed in the spacer 21A and fitting the upper end portion into the fitting groove 214A formed in the spacer 21D, the positive electrode terminal support member 23 is held by the spacer 21A and the spacer 21D. By having the spacer 21A and the spacer 21D hold the positive electrode terminal support member 23 attached to the positive electrode terminal 22 in this manner, the positive electrode terminal 22 is supported fixedly by the positive electrode terminal support member 23.

Hence, when external forces caused by vibration and rotary torque generated during screwing are exerted on the positive electrode terminal 22, stress concentration in the first joint portion 225 and second joint portion 226 can be suppressed. In other words, rotation of the positive electrode terminal 22 when a bolt is fastened to the terminal portion 222 of the positive electrode terminal 22 and vibration of the positive electrode terminal 22 during travel can be suppressed. As a result, joint defects between the first joint portion 225 and second joint portion 226 of the positive electrode terminal 22 and the positive electrode tabs 12 of the unit cell 1A and unit cell 1B can be suppressed.

Further, an outer periphery of the terminal portion 222 of the positive electrode terminal 22 is covered by the outer edge wall 235 such that the terminal portion 222 of the positive electrode terminal 22 is held by the outer edge wall 235. As a result, rotation of the positive electrode terminal 22 when a bolt is fastened to the terminal portion 222 of the positive electrode terminal 22 and vibration of the positive electrode terminal 22 during travel can be further suppressed.

It should be noted that the negative electrode terminal 24 is supported fixedly by the negative electrode terminal support member 25 in a similar manner to the positive electrode terminal 22, and therefore a joint defect with the negative electrode tab 13 can likewise be suppressed in the negative electrode terminal 24.

Here, the positive electrode terminal support member 23 and the negative electrode terminal support member 25 may be held by the battery case 31. However, this embodiment is superior for the following reason.

The unit cell 1 formed from a flexible laminate film or the like is likely to undergo volumetric change in a lamination direction during charging/discharging. Therefore, when the positive electrode terminal support member 23 is held by the battery case 31, relative positions between the positive electrode terminal support member 23 and the respective joint portions joined to the positive electrode tabs 12 of the unit cells 1, for example, vary due to the volumetric change in the unit cells 1. As a result, contact defects occur easily between the positive electrode tabs 12 and the respective joint portions.

In this embodiment, however, the positive electrode terminal support member 23 and the negative electrode terminal support member 25 are held by the spacers 21, and therefore, even when volumetric change occurs in the unit cells 1, resulting variation in the relative positions between the positive electrode terminal support member 23 and the respective joint portions is extremely small. As a result, contact defects are unlikely to occur between the positive electrode tabs 12 and the respective joint portions.

Figure 9:
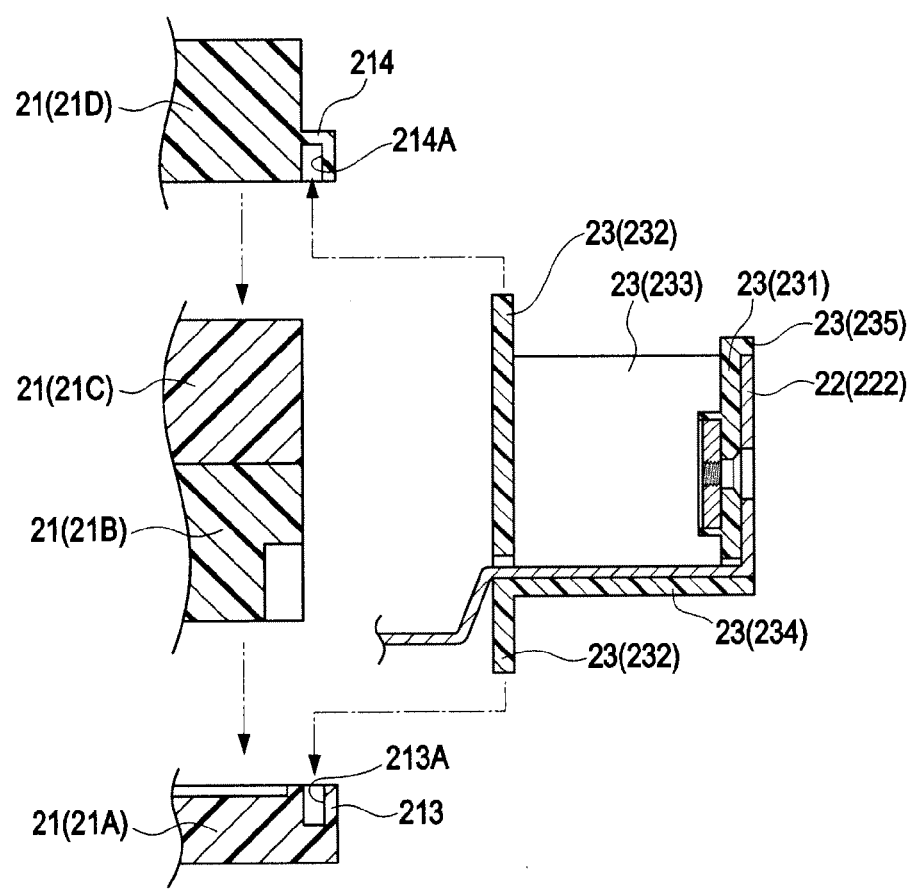
FIG. 9 is a view illustrating a method of attaching the positive electrode terminal support member.

FIG. 9 is a view illustrating a method of attaching the positive electrode terminal support member 23.

To attach the positive electrode terminal support member 23, first, the lower end portion of the back surface wall 232 of the positive electrode terminal support member 23 attached to the positive electrode terminal 22 is fitted into the fitting groove 213A formed in the site 213 that projects partially from the spacer 21A.

Next, the spacer 21B is laminated onto the spacer 21A and the spacer 21C is laminated onto the spacer 21B.

Next, the spacer 21D is laminated onto the spacer 21C while fitting the upper end portion of the back surface wall 232 of the positive electrode terminal support member 23 into the fitting groove 214A formed in the site 214 that projects partially from the spacer 21D.

In this embodiment, the fitting grooves 213A, 213A are formed in the sites 213, 214 projecting partially from the spacer 21A and the spacer 21D, and therefore the positive electrode terminal support member 23 can be attached easily during a series of operations for laminating the spacers 21.

Hence, a complicated process for attaching a component in a direction other than the lamination direction is not required, and therefore a manufacturing process can be automated easily. Moreover, the positive electrode terminal support member 23 can be attached by a substantially identical operation to a conventional spacer lamination operation. As a result, an increase in a number of manufacturing steps can be suppressed.

Next, referring to FIGS. 10 and 11, a second embodiment of this invention will be described.

Figure 10:
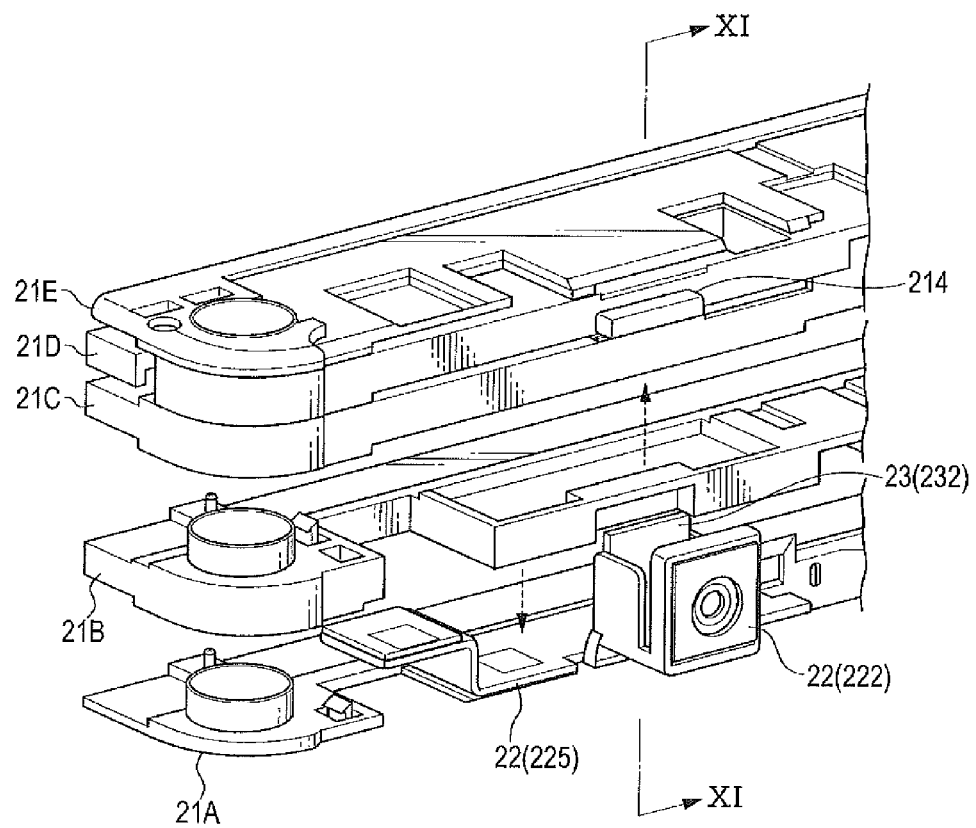
FIG. 10 is an exploded perspective view showing an enlargement of a positive electrode terminal part of a laminated battery according to a second embodiment of this invention.

FIG. 10 is a perspective view showing an enlargement of the positive electrode terminal 22 part of the laminated battery 2 according to the second embodiment of this invention. FIG. 11 is an XI-XI sectional view of FIG. 10.

Figure 11:
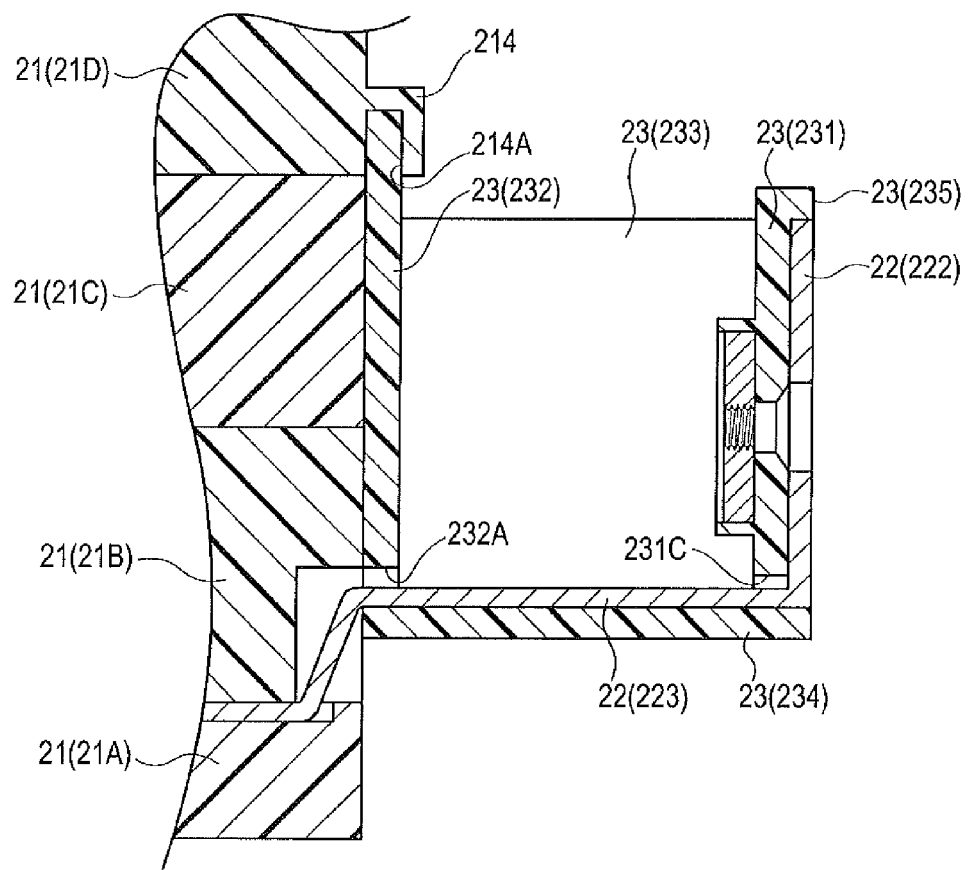
FIG. 11 is an XI-XI sectional view of FIG. 10.

As shown in FIGS. 10 and 11, in the second embodiment of this invention, only the spacer 21D is formed with the fitting groove 214A into which the upper end portion of the back surface wall 232 of the positive electrode terminal support member 23 is fitted. Likewise in this case, the first joint portion 225 of the positive electrode terminal 22 is sandwiched between the spacer 21A and the spacer 21B, and as a result, the positive electrode terminal support member 23 is held by the spacer 21A, the spacer 21B, and the spacer 21D. Hence, the positive electrode terminal 22 can be supported fixedly, and therefore similar effects to those of the first embodiment can be obtained.

It should be noted that this invention is not limited to the embodiments described above, and may of course be subjected to various modifications within the scope of the technical spirit thereof.

For example, examples in which the positive electrode terminal 22 and negative electrode terminal 24 serve as output terminals were described in the above embodiments, but this invention is not limited thereto, and the positive electrode terminal 22 and negative electrode terminal 24 may be voltage detecting terminals for measuring a voltage of the battery module 3.

Figure 12:
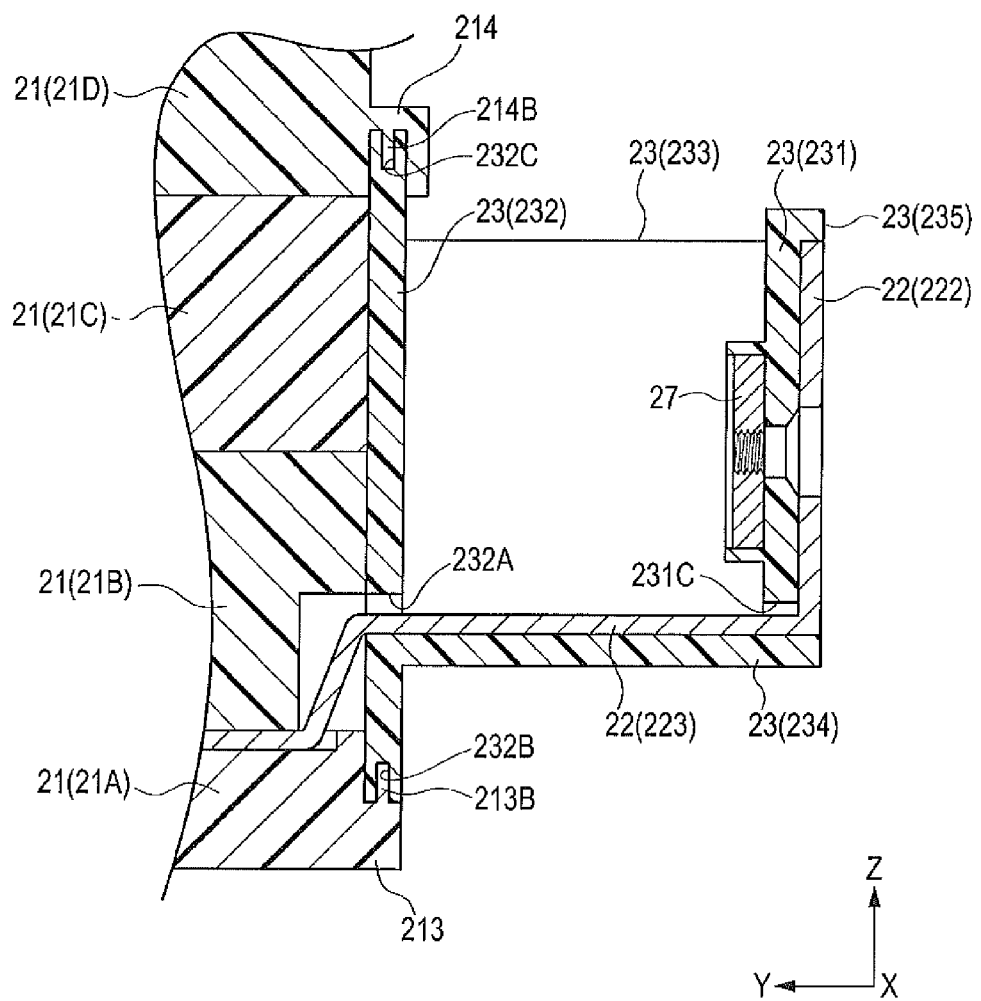
FIG. 12 is a sectional view showing a constitution for holding a positive electrode terminal support member according to a third embodiment of this invention.

Further, in the above embodiments, the lower end portion and the upper end portion of the back surface wall 232 (i.e., a wall portion) of the positive electrode terminal support member 23 are fitted into the fitting grooves provided in the spacer 21A and the spacer 21D, but an opposite structure may be employed. As shown in FIG. 12, for example, fitting grooves 232B, 232C may be provided in a lower end and an upper end of the back surface wall 232 of the positive electrode terminal support member 23, and projections 213B, 214B (i.e., projection portions) formed on the spacer 21A and the spacer 21D may be fitted into the fitting grooves 232B, 232C. Furthermore, the structure for fitting together the spacers 21 and the positive electrode terminal support member 23 is not limited to the projections and grooves described above.

Figure 13:
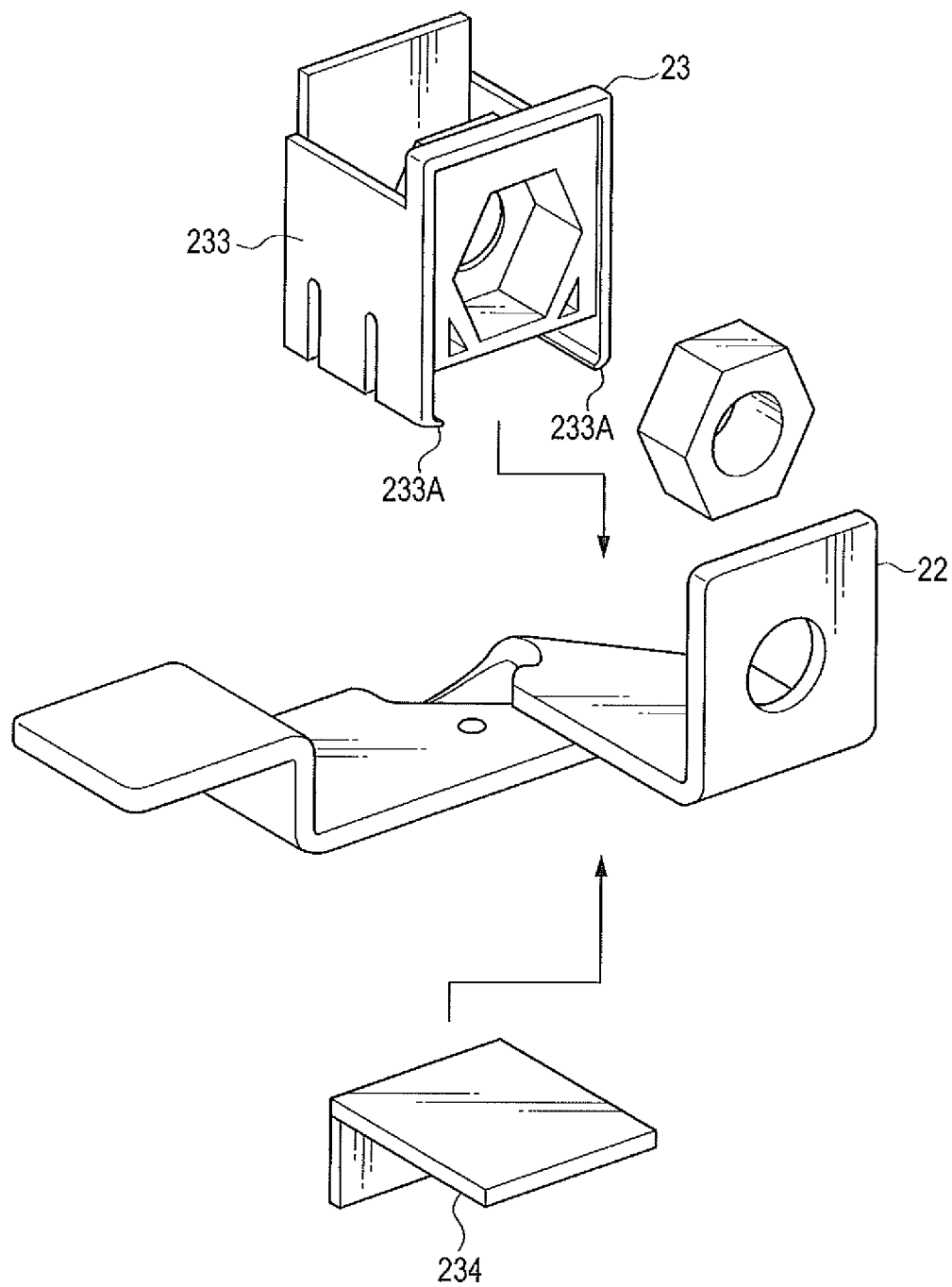
FIG. 13 is a sectional view showing a constitution for holding a positive electrode terminal support member according to a fourth embodiment of this invention.

Moreover, in the above embodiments, the positive electrode terminal 22 and the positive electrode terminal support member 23 are formed integrally, but as shown in FIG. 13, for example, the bottom surface wall 234 may be provided separately and attached subsequently by a snap fit pawl 233A or the like provided on a lower end of each side surface wall 233.

With respect to the above description, the content of Tokugan 2009-118228, with a filing date of May 15, 2009 in Japan, and the content of Tokugan 2010-111330, with a filing date of May 13, 2010 in Japan, are incorporated herein by reference.

INDUSTRIAL APPLICABILITY

As described above, this invention exhibits particularly favorable effects when applied to a vehicle-installed battery formed by connecting a plurality of the battery modules 3.

Exclusive properties or features encompassed by the embodiments of this invention are as claimed below.

The invention claimed is:

1. A laminated battery formed by laminating a plurality of flat cells each having an electrode tab, comprising:
    at least one insulating member disposed to prevent the electrode tab from a short-circuit; and
    a terminal connected to the electrode tab,
    wherein a tip end side of the terminal is inserted in a support member provided on the at least one insulating member such that the terminal is supported by the support member.

2. The laminated battery as defined in claim 1, wherein
    the at least one insulating member comprises a holding portion that projects from the at least one insulating member, and
    the holding portion holds the support member in a lamination direction of the flat cells.

3. The laminated battery as defined in claim 2, wherein
    the at least one insulating member comprises a plurality of insulating members,
    the holding portion comprises a first holding portion that projects from one of the insulating members and a second holding portion that projects from another of the insulating members which is different from the one of the insulating members, and
    the first holding portion and the second holding portion hold the support member from either side in the lamination direction of the flat cells.

4. The laminated battery as defined in claim 1, wherein
    the at least one insulating member comprises a plurality of insulating members, and
    a joint portion of the terminal is held by the insulating members.

5. The laminated battery as defined in claim 1, wherein the at least one insulating member comprises a holding portion projecting from the at least one insulating member, and
    the support member comprises a wall surface that supports the tip end side of the terminal and a wall portion held by the holding portion.

6. The laminated battery as defined in claim 5, wherein
    the at least one insulating member comprises a plurality of insulating members,
    the holding portion comprises a first holding portion that projects from one of the insulating members and a second holding portion that projects from another of the insulating members which is different from the one of the insulating members, and
    the wall portion is held by the first holding portion and the second holding portion.

7. The laminated battery as defined in claim 5, wherein
    the at least one insulating member comprises a plurality of insulating members,
    the terminal comprises a joint portion joined to the electrode tab, and
    the joint portion is held by the insulating members.

8. The laminated battery as defined in claim 5, wherein the support member comprises a recessed portion and a through hole configured to receive a connecting member configured to fix the terminal to the support member.

9. The laminated battery as defined in claim 1, wherein
the terminal comprises on the tip end side thereof a support member attachment portion to which the support member is attached,
the support member comprises a wall portion that extends in a lamination direction of the flat cells when the support member is attached to the support member attachment portion, and
the at least one insulating member comprises a holding portion that projects in an orthogonal direction to the lamination direction of the flat cells and holds the wall portion.

10. The laminated battery as defined in claim 9, wherein the holding portion comprises a fitting groove into which the wall portion is fitted.

11. The laminated battery as defined in claim 9, wherein
the holding portion further comprises a projecting portion that projects in a parallel direction to the lamination direction of the flat cells, and
the wall portion comprises a fitting groove into which the projecting portion is fitted.

12. The laminated battery as defined in claim 9, wherein the wall portion extends upward in the lamination direction of the flat cells.

13. The laminated battery as defined in claim 9, wherein the wall portion extends upward and downward in the lamination direction of the flat cells.

14. The laminated battery as defined in claim 9, wherein
the at least one insulating member comprises a plurality of insulating members,
a joint portion of the terminal is sandwiched between the insulating members, and
the terminal projects from the insulating members on the tip end side thereof.

15. A laminated battery formed by laminating a plurality of flat cells each having an electrode tab, comprising:
an insulating member disposed to prevent a short-circuit in the electrode tab; and
a terminal connected to the electrode tab,
wherein a tip end side of the terminal is supported by a support member provided on the insulating member, and
wherein one of the insulating member and the support member includes a fitting groove configured to receive and hold a portion of an other of the insulating member and the support member.

16. A manufacturing method for a laminated battery formed by alternately laminating flat cells, each of the flat cells having an electrode tab and insulating members for preventing a short-circuit in the electrode tab, the method comprising:
joining the electrode tab to a joint portion of a power input/output terminal, and
sandwiching the joint portion of the power input/output terminal between the insulating members so that a tip end side of the power input/output terminal projects from a side surface of the insulating members,
wherein an insulating member selected from the insulating members includes a fitting groove configured to receive and hold a portion of a support member attached to the tip end side of the power input/output terminal, or
a support member attached to the tip end side of the power input/output terminal includes a fitting groove configured to receive and hold a portion of an insulating member selected from the insulating members.

17. A battery module comprising:
the laminated battery as defined in claim 1, and
a battery case,
wherein the laminated battery is housed in the battery case.

18. The battery module as defined in claim 17, wherein the battery case comprises a hole portion through which the terminal is led to an exterior of the battery case.

* * * * *